United States Patent [19]

Van den Brink et al.

[11] 4,326,178

[45] Apr. 20, 1982

[54] GAS DISCHARGE LASER

[75] Inventors: Hans G. Van den Brink; Theodorus F. Lamboo, both of Eindhoven, Netherlands

[73] Assignee: U.S. Philips Corporation, New York, N.Y.

[21] Appl. No.: 108,207

[22] Filed: Dec. 28, 1979

[30] Foreign Application Priority Data

Aug. 3, 1979 [NL] Netherlands ........................ 7905969

[51] Int. Cl.$^3$ ............................................. H01S 3/05
[52] U.S. Cl. ........................................ 372/61; 372/98
[58] Field of Search .................... 331/94.5 DC, 94.56

[56] References Cited

U.S. PATENT DOCUMENTS 4,081,762 3/1978 Golser et al. ................. 331/94.5 G Primary Examiner—William L. Sikes
Assistant Examiner—Léon Scott, Jr.
Attorney, Agent, or Firm—Robert T. Mayer; Bernard Franzblau

[57] ABSTRACT

A gas discharge laser comprising a glass cylindrical discharge vessel having at least one end sealed by means of a metal cap provided at its center with a reflector body and in which a metal exhaust tube is connected eccentrically to the cap. By forming the metal cap in the shape of a truncated cone and providing the metal exhaust tube in the conical surface therof, a gas discharge laser having a high degree of directional stability is obtained.

5 Claims, 1 Drawing Figure

U.S. Patent     Apr. 20, 1982     4,326,178
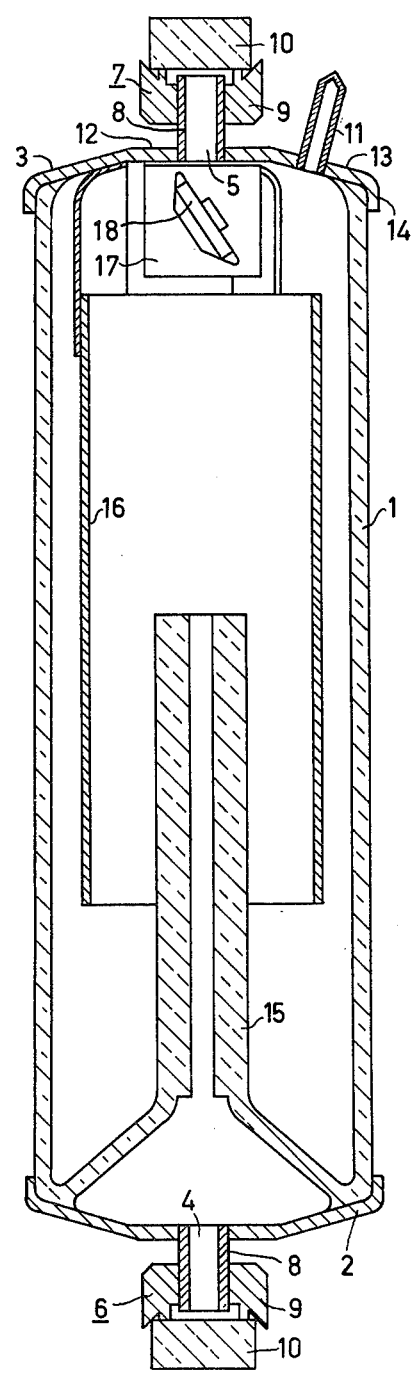

GAS DISCHARGE LASER

The invention relates to a gas discharge laser comprising a glass cylindrical discharge vessel of which at least one end is sealed by means of a metal cap having a reflector body in the center thereof, a metal exhaust tube being secured eccentrically to the cap.

Such a gas discharge laser is disclosed in U.S. Pat. No. 4,238,743. Such gas discharge lasers have a wide field of application, for example, for aligning constructions, in control systems, devices for measuring distances, copying machines, measuring devices for measuring air and water pollution, and in particular in systems for displaying optical record carriers, for example, a video disc player for displaying video discs via a televisor.

For a large number of these applications a good directional stability of the generated laser beam is necessary. In the said U.S. patent better directional stability of the generated laser beam is obtained by connecting a compensating tubular element to the metal cap which seals one end of the discharge vessel. This tubular element is connected at a point radially symmetrically opposite to the exhaust tube. The metal cap has a convex shape and is connected to the glass of the discharge vessel by means of a so-called "drop seal". In a "drop seal" the glass is buckled during the sealing. The exhaust tube forms an asymmetrical thermal load for the metal cap as a result of which the convex metal cap will deform upon heating after putting the laser in operation, so that the reflector body tilts again. The compensating tubular element compensates the deformation of the metal cap. It will be obvious that such a solution is laborious and expensive because an element has to be added to the construction which must be located on the cap accurately at a point radially symmetrically opposite to the metal exhaust tube. Moreover, small differences in dimensions and mass between the exhaust tube and the compensating element will nevertheless still give rise to deformations.

It is therefore an object of the invention to obtain a greater directional stability of the generated laser beam without the addition of an element to the construction.

According to the invention, a gas discharge laser of the kind mentioned in the opening paragraph is characterized in that the metal cap has substantially the shape of a truncated cone, the reflector member being provided at the centre of the apical surface of the truncated cone and the metal exhaust tube being present in the conical surface. The conical surface preferably changes, at its widest end, into a cylindrical collar which surrounds the end of the glass tube of the discharge vessel. This collar gives extra rigidity to the glass-to-metal connection (butt-seal) of the cap to the glass wall of the discharge vessel. Why the directional stability of the laser beam is greater in a cap having the shape of a truncated cone is not quite clear. It is believed that the flatness of the conical surface in an axial direction also results in an axial rigidity. This rigidity makes the cap considerably less sensitive to the provision of an opening having therein an exhaust tube which usually consists of a material having a different coefficient of expansion.

A cap having the shape of a truncated cone with an apical angle of approximately 150° gave particularly good results.

The invention will now be described in greater detail, by way of example, with reference to the accompanying drawing which provides a longitudinal sectional view of a He-Ne gas discharge laser according to the invention.

This laser consists of a cylindrical discharge vessel 1 made of glass which is sealed at either end by metal caps 2 and 3 which are connected to the glass by means of a so-called "butt seal" and which are provided with the central apertures 4 and 5 to which reflector members 6 and 7 are connected. Each reflector member consists of a tubular part 8 which is secured in the apertures 4 and 5, reflector holders 9 and multi layer reflectors 10. An exhaust tube 11, which after filling the gas discharge laser is pinched and/or soldered, is secured to the cap 3. Cap 3 has substantially the shape of a truncated cone having an apical surface 12 and a conical surface 13 and a collar 14. In caps without a collar 14 the connection to the glass discharge vessel may be done by means of a "drop seal". According to the invention, the exhaust tube 11 should be provided in the conical surface of the truncated cone. The tube hardly influences the direction of the reflector member 7 so that a great directional stability of the laser beam is obtained. The reflectors 10, together with the laser capillary 15, constitute the laser resonator. A cylindrical cathode 16 extending coaxially in the envelope is also provided in the envelope of the laser. In order to obtain polarized light from the laser, a Brewster window 18 is provided near the reflector member 7 in a holder 17.

Until now, glass exhaust tubes have sometimes been provided in the cylindrical glass wall of the discharge vessel. However, for mass production, metal exhaust tubes provided in the manner according to the invention are much more attractive because they are simpler to manufacture and are suitable for automated production.

The He-Ne laser shown in the FIGURE is approximately 25 cm long and has a diameter of approximately 30 mm. The metal caps consist of a deep-drawn metal about 1 mm thick adhering to glass. A good adhesion to a hard glass is provided by caps of, for example, fernico. Caps of, for example, Dilvero or Nilo 475 (a Cr-Fe alloy and a Cr-Ni-Fe alloy, respectively, trade names of Metalimphy, Paris, France) readily adhere to soft glasses. The apical angle of the truncated cone is 150° so that the conical surface 13 makes an angle of 75° with the axis of the laser. The diameter of the apical surface 12 is 12 mm. The collar 14 has an inside height of 1.5 mm. The metal exhaust tube 11 has a diameter of 4 mm.

What is claimed is:

1. A gas discharge laser comprising a glass cylindrical discharge vessel containing a gas including an active lasing medium, means including a pair of reflectors at opposite ends of the discharge vessel for defining a resonant cavity, means including first and second electrodes for establishing an electric discharge in said gas, a metal cap in the shape of a truncated cone sealing one end of the discharge vessel, the truncated cone metal cap having an apical surface and a conical surface, a metal exhaust tube eccentrically located in the conical surface of the metal cap, and a reflector member including one of said reflectors and mounted in the center of the apical surface of the truncated cone metal cap.

2. A gas discharge laser as claimed in claim 1 wherein the conical surface of the metal cap is formed into a cylindrical collar at its widest end.

3. A gas discharge laser as claimed in claims 1 or 2 wherein the apical surface of the truncated cone forms an apical angle of approximately 150°.

4. A gas discharge laser as claimed in claims 1 or 2 wherein the discharge vessel has a diameter of approximately 30 mm and the apical surface has a diameter of approximately 12 mm.

5. A gas discharge laser as claimed in claim 1, wherein the resonant cavity defining means further comprises a laser capillary tube within the discharge vessel and having a longitudinal axis that coincides with the optical axes of said reflectors, and wherein one of said reflectors allows energy to be abstracted from the laser.

* * * * *